(12) United States Patent
Sebesta et al.

(10) Patent No.: US 12,265,635 B2
(45) Date of Patent: Apr. 1, 2025

(54) SELECTIVE SECURITY AUGMENTATION IN SOURCE CONTROL ENVIRONMENTS

(71) Applicant: Microsoft Technology Licensing, LLC, Redmond, WA (US)

(72) Inventors: Filip Sebesta, Seattle, WA (US); Yu Lin Sie, Suzhou (CN); Yi Zeng, Bothell, WA (US); Lingxia Chen, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 17/927,675

(22) PCT Filed: Jun. 29, 2020

(86) PCT No.: PCT/CN2020/098712
§ 371 (c)(1),
(2) Date: Nov. 23, 2022

(87) PCT Pub. No.: WO2022/000156
PCT Pub. Date: Jan. 6, 2022

(65) Prior Publication Data
US 2023/0177184 A1  Jun. 8, 2023

(51) Int. Cl.
G06F 21/62 (2013.01)
G06F 21/31 (2013.01)
G06F 21/60 (2013.01)

(52) U.S. Cl.
CPC .......... *G06F 21/6209* (2013.01); *G06F 21/31* (2013.01); *G06F 21/604* (2013.01)

(58) Field of Classification Search
CPC ..... G06F 21/6209; G06F 21/31; G06F 21/604
See application file for complete search history.

(56) References Cited

U.S. PATENT DOCUMENTS

2007/0061571 A1  3/2007  Hammes et al.
2011/0004921 A1  1/2011  Homer et al.
(Continued)

FOREIGN PATENT DOCUMENTS

| CN | 1579080 A | 2/2005 |
| CN | 101833563 A | 9/2010 |

(Continued)

OTHER PUBLICATIONS

Extended European search report received in European Patent Application No. 20943253.3, mailed on Jan. 29, 2024, 8 Pages.
(Continued)

*Primary Examiner* — Frantz B Jean
(74) *Attorney, Agent, or Firm* — Schwegman Lundberg & Woessner, P.A.

(57) ABSTRACT

A method enhances authentication requirements to documents of a document repository based, at least in part, on a security policy associated with a branch under which the documents are organized. The method implements an approval service that is identified in a branch policy. The approval service determines whether a user is authorized to modify documents included in the branch. The method further selectively requires multiple authentications from multiple authentication systems in order to access one or more particular branches in a document repository. Further, the multiple authentication systems are based on separate and independent sets of authentication credentials.

20 Claims, 8 Drawing Sheets

(56) References Cited

U.S. PATENT DOCUMENTS

| | | | | |
|---|---|---|---|---|
| 2014/0331060 A1* | 11/2014 | Hayton | ............... | G06F 21/32 |
| | | | | 713/185 |
| 2015/0134600 A1 | 5/2015 | Eisner | | |
| 2017/0099297 A1 | 4/2017 | Armer | | |
| 2017/0337255 A1* | 11/2017 | Holmes-Higgin | .... | G06F 16/178 |

FOREIGN PATENT DOCUMENTS

| | | | |
|---|---|---|---|
| CN | 102571703 A | 7/2012 | |
| CN | 102771101 A | 11/2012 | |
| CN | 103650412 A | 3/2014 | |
| CN | 104937909 A | 9/2015 | |
| CN | 105830389 A | 8/2016 | |
| CN | 107431692 A | 12/2017 | |
| CN | 108287987 A | 7/2018 | |
| CN | 109274769 A | 1/2019 | |

OTHER PUBLICATIONS

EPO Communication pursuant to Rules 70(2) and 70a (2) received in European Application No. 209432533, mailed on Feb. 15, 2024, 1 page.

Office Action Received for Chinese Application No. 202080063102. 1, mailed on Feb. 27, 2024, 15 pages (English Translation Provided).

"Source Providers—Get Pull Request", Retrieved From: https://learn.microsoft.com/en-US/rest/api/azure/devops/build/source-providers/get-pull-request?view=azure-devops-rest-5. 1#referencelinks, Retrieved Date: Dec. 13, 2019, 5 Pages.

Kathrynee, et al., "About Security, Authentication, And Authorization", Retrieved From: https://learn.microsoft.com/en-us/azure/devops/organizations/security/about-security-identity?toc=%2Fazure%2Fdevops%2Forganizations%2Fsecurity%2Ftoc.json&bc=%2Fazure%2Fdevops%2Forganizations%2Fsecurity%2Fbreadcrumb%2Ftoc.json&view=azure-devops, Nov. 12, 2022, 8 Pages.

Machiraju, et al., "About Branches and Branch Policies", Retrieved From: https://learn.microsoft.com/en-US/azure/devops/repos/git/branch-policies-overview?view=azure-devops, Oct. 5, 2022, 5 Pages.

"International Search Report and Written Opinion Issued in PCT Application No. PCT/CN2020/098712", Mailed Date: Mar. 25, 2021, 10 Pages.

Notice of Allowance Received for Chinese Application No. 202080063102.1, mailed on Dec. 29, 2024, 08 Pages (English Translation Provided).

* cited by examiner

SELECTIVE SECURITY AUGMENTATION IN SOURCE CONTROL ENVIRONMENTS

CROSS-REFERENCE TO RELATED APPLICATION

This application is a U.S. National Stage Filing under 35 U.S.C. 371 of International Patent Application Serial No. PCT/CN2020/098712, filed Jun. 29, 2020, and published as WO 2022/000156 A1 on Jan. 6, 2022, which application and publication are incorporated herein by reference in their entirety.

BACKGROUND

Despite significant progress over the past several decades, the security of electronic systems continues to be at risk. Some of these risks are associated with nefarious actors, external to an enterprise, successfully usurping traditional means of protecting enterprise resources. For example, nefarious actors can obtain, either illicitly or otherwise, authentication credentials that provide access to enterprise resources. In some cases, software with relatively strong security protections can still include vulnerabilities, which can be discovered and exploited by nefarious actors with sufficient skill and resources necessary to identify these vulnerabilities. Vulnerabilities also exist within a software organization that develops the software. If a vulnerability can be intentionally included in a software product that is eventually released to the public, these vulnerabilities can then be exploited. Such exploitation can result in the data of customers of said software product being compromised. Thus, improvements in computer security are needed to further reduce risks associated with the operation and development of computer software.

DETAILED DESCRIPTION

As discussed above, the current state of the art in computer security presents a technical problem in that it remains possible for nefarious actors to gain unauthorized access to computer resources. This can occur by the nefarious actor obtaining authentication credentials, which provides them with access to computer resources protected by those credentials. Unauthorized access can also occur when a nefarious actor is provided with access to computer resources, for example, as part of their employment. The nefarious actor then misuses their access to further their own nefarious objectives outside the scope of their employment.

The disclosed embodiments present a technical solution to this technical problem. The technical solution reduces an ability of a nefarious actor to gain unauthorized access as described above. Some of these embodiments define a security policy for a branch of a version control system. The security policy defines one or more authentications that must be completed (subject to optional one or more criterion) before access to particular portions or branches of a document repository is granted to an account.

In some embodiments, whether an authentication is required is conditioned on which branch of a version control system is being accessed. Some branches, for example, those used by software engineers for their own development work and testing, are subject to a lesser degree of authentication than other branches, the documents of which are used to generate executable images that are distributed to or run on behalf of, customers. By enabling an amount of authentication required for access to vary based on the branch being accessed, flexibility of access is maintained. This flexibility minimizes any additional burden placed on software engineers as they go about their daily work, while providing additional security when it matters most, as when software engineering work product is submitted to a branch used to generate running software consumed by customers.

To achieve additional flexibility in the application of additional authentication procedures, some embodiments condition additional authentication on one or more criterion, including a particular portion of a branch being accessed, an amount of data being accessed, or a geographic region or network domain in which the requesting user is located (or isn't located). For example, some modifications to operating system code, such as modifications to user space applications, may be considered less critical and can thus be made, at least in some embodiments, without an additional authentication. Changes to operating system kernel code, or any code that runs in kernel space, is considered more critical to system security, at least in some embodiments, and thus requires an additional authentication. Thus, engineers tasked with ancillary user space work may experience no additional burden due to the additional security provided by these embodiments, while changes to kernel modules will require enhanced authentication procedures. Similarly, some embodiments govern an amount of authentication required based on a size of a portion of the document repository being accessed. As one example, if a user requests to check out an entire operating system kernel of a particular branch, additional authentication is required in some embodiments. In some embodiments, a check out of a single kernel file on the same particular branch requires no additional authentication.

Thus, the disclosed embodiments provide a flexible approach to providing additional security in a document version control system. This flexible approach provides for increased levels of security in appropriate circumstances, while minimizing any overhead imposed on software engineers during their daily job duties, and imposed on the computing systems that would otherwise have to perform additional security operations.

Figure 1:
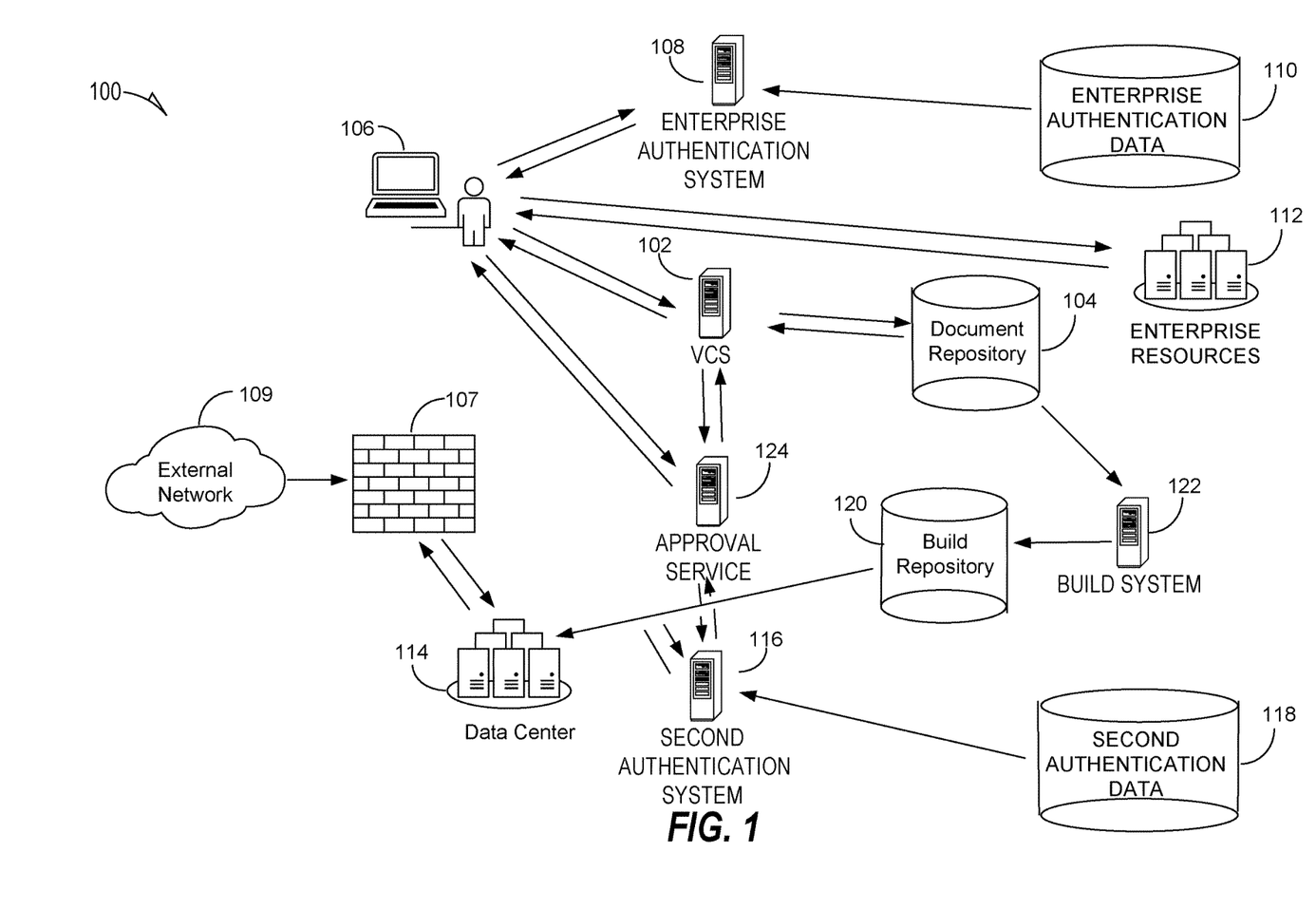
FIG. 1 is an overview diagram of a system implementing one or more of the disclosed embodiments.

FIG. 1 is an overview diagram of a system implementing one or more of the disclosed embodiments. FIG. 1 shows a version control system (VCS) 102 that accesses a document repository 104. The document repository 104 stores source code for a software product. The code repository is controlled by the VCS 102, which provides for controlled access to the document repository 104. For example, a client device 106 can obtain copies of at least a portion of the software stored in the document repository 104 if logged in to an account having sufficient privileges. In the example embodiment of FIG. 1, access to the document repository 104 via the VCS 102 is provided by an enterprise authentication system 108. The enterprise authentication system 108 consults enterprise authentication data store 110 to validate credentials provided by the client device 106 when authenticating for access to enterprise resources 112 and/or the document repository 104. The enterprise authentication system 108 associates the account with a first set of credentials. Thus, when providing access to the document repository 104, the VCS 102 is configured to require that an account attempting the access has been previously authenticated by the enterprise authentication system 108.

The example system 100 also includes a build repository 120. The build repository receives code from a build system 122. The build system 122 receives code from the document repository 104 and compiles or otherwise processes the code received from the code repository to generate one or more executable images, which are stored in the build repository 120.

The system 100 also includes a data center 114. The data center 114 hosts one or more applications accessible via a network 109 via a firewall 107. Permission to modify any files of the data center 114 (e.g. executable files) is provided via a second authentication system 116, which relies on a second authentication data store 118. For example, the second authentication data store 118 defines authentication credentials separate and independent from the enterprise authentication data store 110. Executable images generated by the build system 122 and stored in the build repository 120 are written to the data center 114 under certain conditions, for example, during a new release of software that is operating within the data center 114. In order to update software running in the data center 114, authentication via the second authentication system 116 is required in the example embodiment of FIG. 1.

FIG. 1 further shows an approval server 124. The VCS 102 is configured to implement branch specify policies that require additional approval by the approval server 124 before any changes are made to a particular branch. In some embodiments, the approval server 124 executes or runs an approval service, which provides one or more functions attributed to the approval server as discussed below.

If a particular branch is configured such that approval by the approval server 124 is required, the VCS 102 requests such approval from the approval server 124. The approval server 124 is configured, in some embodiments, to obtain authentication of the user via the second authentication system 116 before approving a particular user to modify a particular branch. Again, this additional authentication is defined by a policy specific to a particular branch maintained by the VCS 102. The second authentication system 116 is configured to associate the account with a second set of credentials. Upon successfully obtaining authentication of the user via the second authentication system 116, the approval service approves modifications of the branch by the user and provides this information back to the VCS 102.

Figure 2:
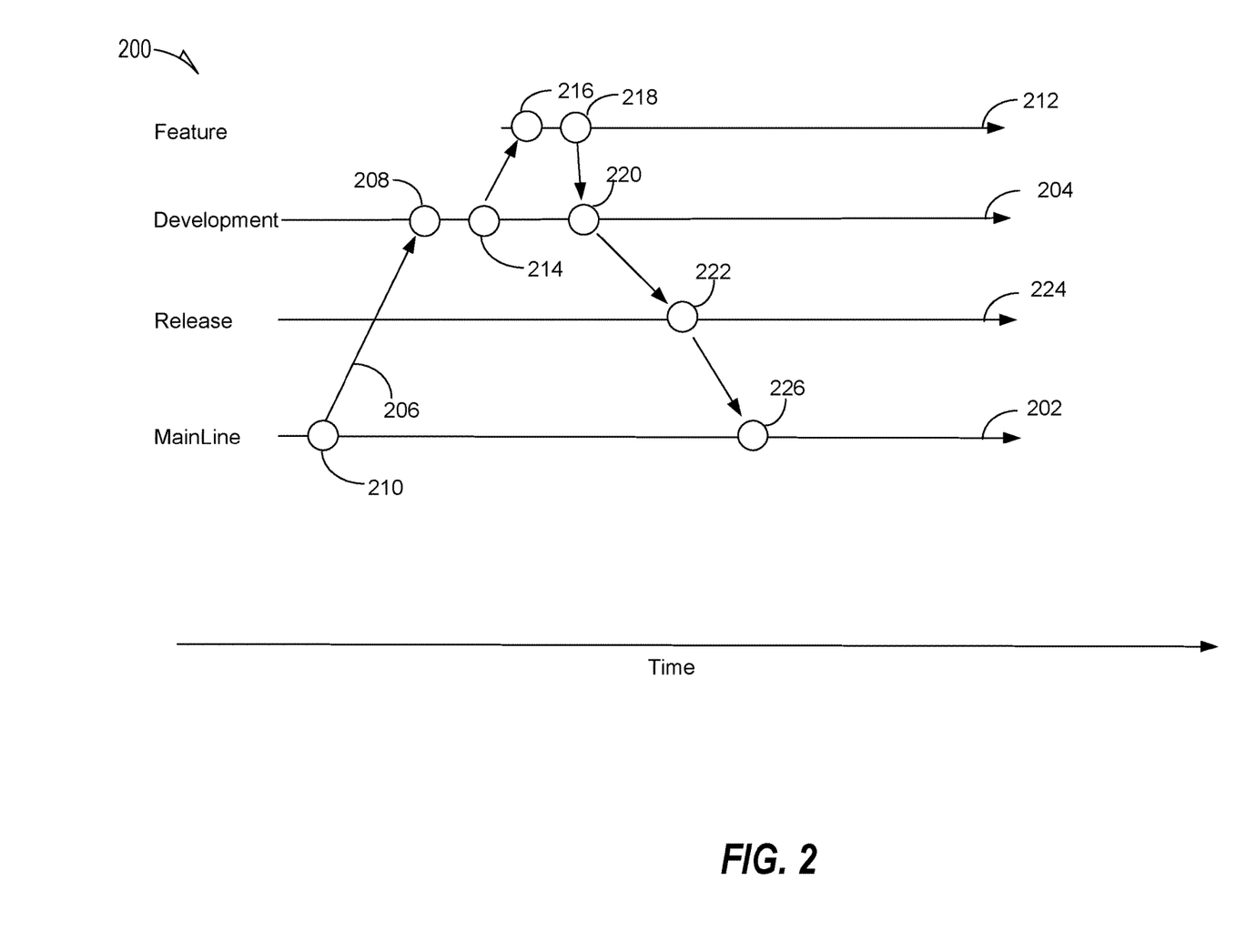
FIG. 2 shows an example of document branches maintained by the version control system 102 in an example embodiment.

FIG. 2 shows an example of document branches 200 maintained by the VCS 102 in an example embodiment. FIG. 2 shows a mainline branch 202. A development branch 204 receives a copy of the mainline branch at a branching operation 206, such that a checkpoint 208 of the development branch 204 includes documents equivalent to those at checkpoint 210 of the mainline branch 202.

A feature branch 212 is created from checkpoint 214 of the development branch 204, such that checkpoint 216 of the feature branch 212 includes equivalent documents as checkpoint 214 of the development branch 204. Documents at a checkpoint 218 of feature branch 212 are integrated with documents at checkpoint 220 of the development branch 204. Documents are a checkpoint 222 of a release branch 224 are integrated with documents at a checkpoint 226 of the mainline branch 202.

At least some of the disclosed embodiments associate a security policy with one or more of the mainline branch 202, or the development branch 204, feature branch 212, or release branch 224. The security policy devices one or more criterion that must be met before access to the branch is provided. In some embodiments, read access to a branch is associated with a first security polity and write access to the branch is associated with a second security policy.

In some embodiments a security policy associated with a branch specifies one or more authentications that are required for access to the branch. For example, a security policy specifies, in some embodiments, that authentication with the enterprise authentication system 108 is required for access to a branch associated with the security policy. In some embodiments, the security policy further requires authentication with the second authentication system 116 before access to the branch is provided.

Some embodiments condition one or more of the specified authentications based on a type of access provided. For example, in some embodiments, read access to a branch requires only authentication with a single authentication system (e.g. enterprise authentication system 108), which write access to the branch requires authentication with at least two authentication systems (e.g. enterprise authentication system 108 and second authentication system 116).

Some embodiments condition one or more of the specified authentications based on amount of data accessed on the branch. For example, in some embodiments, if a number of files or a number of bytes for which access is requested exceeds a threshold (e.g. defined by the security policy), then the authentication is required.

Some embodiments condition one or more of the specified authentications based on a location of a user/account requesting the access. Thus, for example, if the account requesting access is requesting access from within a predefined geographic region (e.g. corresponding to a corporate campus), a specified authentication is not required in some embodiments. In some other embodiments, if the requested access is from a defined geographic region, then the specified authentication is required. This requirement for additional authentication based on location is also based, in some embodiments, on which branch is being accessed. Thus, in some embodiments, one or more branches have no additional authentication requirements based on client location, while another branch does have additional authentication under certain location conditions.

Figure 3:
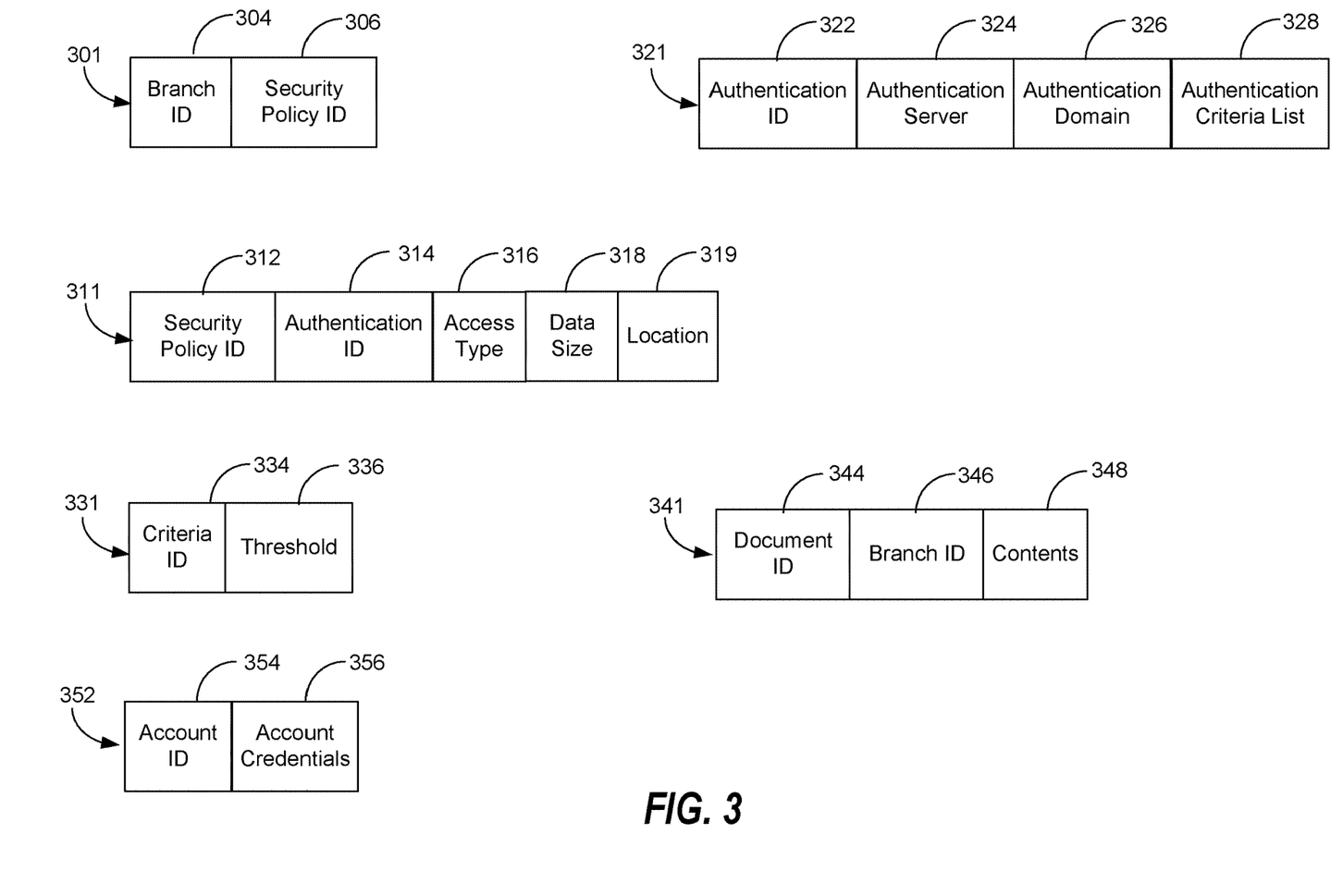
FIG. 3 shows example data structures implemented in one or more of the disclosed embodiments.

FIG. 3 shows example data structures implemented in one or more of the disclosed embodiments. While the example data structures of FIG. 3 are discussed below as relational database tables, various embodiments will utilize a variety of known data architectures. For example, some embodiments implement one or more of relational database tables, unstructured data stores, traditional in-memory structures such as linked lists, trees, arrays, or other data structure architectures. The examples provided in FIG. 3 are in no way intended to limit data structures utilized by one or more of the disclosed embodiments.

FIG. 3 shows a branch table 301, security policy table 311, authentication table 321, criterion table 331, and document table 341. The branch table 301 includes a branch identifier field 304 and a security policy identifier field 306. The branch identifier field 304 uniquely identifies a branch, such as any of the mainline branch 202, development branch 204, feature branch 212, or release branch 224 discussed above with respect to FIG. 2. The security policy identifier field 306 identifies a security policy of the security policy table 311, discussed further below, that is applied to the branch (identified by the field 304).

The security policy table 311 includes a security policy identifier field 312 an authentication identifier field 314, an access type field 316, data size field 318, and a location field 319. The security policy identifier field 312 uniquely identifies a security policy and can be cross referenced with the security policy identifier field 306. The authentication identifier field 314 identifies an authentication that is required to pass (conditioned on any criterion associated with the authentication, as discussed further below), in order for access to the branch to be allowed. The access type field 316 defines a type of access controlled by the authentication. The access type field 316 identifies, in various embodiments, read access, write access, or read and write access. Additional access types that are supported by some embodiments include branch deletion access. The data size field 318 optionally defines a data size limit that when transgressed, requires the additional authentication defined by field 314. For example, one example embodiments does not require additional authentication when modifying a first branch if an amount of data requested is less than an amount defined by the data size field 318, while an additional authentication is required when modifying a second branch if an amount of data requested is less than a second amount defined by the data size field 318 (e.g. the first and second branches would have two different security policies defining different data size limits). Note that in order to prevent a user from working around a data size limit for a particular operation, some embodiments track an amount of data retrieved by a particular account or user within a predefined period of time, or just simply an amount of data retrieved by a particular account during the account's history. This tracked amount is then compared to the data size specified by the data size field 318 for a particular branch, to determine if an additional authentication is necessary.

The location field 319 defines a location that either does or does not require an additional authentication. For example, in some embodiments, the location field 319 defines a location when requires an additional authentication (e.g. a particular country or geographic region on the planet earth). If a client device requesting data from a branch is not within the specified region, then no second authentication is required, at least by the location field 319. In some embodiments, the location field 319 defines a geographic region in which no second authentication is required. For example, the location field 319 defines, in an example embodiment, a corporate campus or other secure region that does not require the additional authentication. Some embodiments provide for multiple location fields to be included in a security policy defined by the security policy table. In these embodiments, location parameters specified by each location field are considered when determining whether to require the additional authentication. Each of the location parameters may be evaluated via logical and or logical or operations (e.g. two distinct geographic regions require authentication).

Note that in some embodiments, multiple rows in the security policy table 311 specify the same security policy identifier value. In this way, a security policy can specify more than one authentication (or more than one conditional authentication) for a single branch (or multiple branches if the multiple branches reference the same security policy identifier).

The authentication table 321 includes an authentication identifier field 322, authentication server field 324, authentication domain field 326, and an authentication criterion list field 328. The authentication identifier field 322 uniquely identifies an authentication required by a security policy and can be cross referenced with the authentication identifier field 314 of the security policy table 311. The authentication server field 324 identifies an authentication server that performs the authentication (specified by the authentication identifier field 322). The authentication domain field 326 identifies a domain in which the authentication is to be performed. The authentication criterion list field 328 identifies one or more criterion that must be met in order for the authentication (identified by the authentication identifier field 322) to be performed. If any of the criterion specified by the authentication criterion list field 328 are not met, the authentication need not be performed in order for access to be granted (conditioned on any other required authentications).

The criterion table 331 includes a criterion identifier field 334 and a threshold field 336. The criterion identifier field 334 uniquely identifies a criterion. For example, some embodiments predefine identifiers with certain conditions. For example, in some embodiments, a first identifier is associated criterion comparing a number of files for which access is requested to a threshold defined by threshold field 336. In some embodiments, a second identifier is associated with criterion comparing an amount of data for which access is requested to a threshold defined by threshold field 336. In some embodiments, a third identifier is associated with criterion comparing a location of a requestor to a predefined region, and applying the authentication if the requestor is within the predefined region. In some embodiments, a fourth identifier is associated with criterion comparing a location of the requestor to a predefined region, and not applying the authentication if the requestor is within the predefined region. In some embodiments, a fifth identifier is associated with criterion comparing a location within a branch (e.g. a file directory structure for which request is accessed) to a predefined location (e.g. wildcarded directory structure or specified by regular expression), and applying the authentication if the requested access is for the predefined location. In some embodiments, a sixth identifier is associated with criterion comparing a location within a branch (e.g. a file directory structure for which access is requested) to a predefined location (e.g. wildcarded directory structure or specified by regular expression), and not applying the authentication if the requested access is for the predefined location.

The document table 341 includes a document identifier field 344, branch identifier field 346, and a contents field 348. The document identifier field 344 and branch identifier field 346, uniquely identify a particular version of a document. Two documents having a common value in the document identifier field but different branch identifier field 346 represent the same document on two different branches, and thus are two different versions of the same document. The contents field 348 defines contents of the document identified by the combination of the document identifier field 344 and branch identifier field 346.

The account table 352 includes an account identifier field 354 and account credentials field 356. The account identifier field 354 uniquely identifies an account of a particular authentication system. The account credentials field 356 defines a set of credentials (e.g. one or more of account name and/or account password) for authenticating of the account. Some embodiments implement a first authentication data store (e.g. the enterprise authentication data store 110) that is relied upon for a first authentication of a user, and a second authentication data store (e.g. second authentication data store 118) that is relied upon for a second authentication. In these embodiments, each data store stores separate and independent authentication credential information. For example, a first user has a first account name and first password stored in the first authentication data store, and a second different account name and second different password stored in the second authentication data store. In some embodiments, account names assigned to a single "real" user are equivalent in the first and second authentication data stores. Some example embodiments utilize a structure similar or equivalent to the account table 352 to store authentication credentials.

Figure 4:
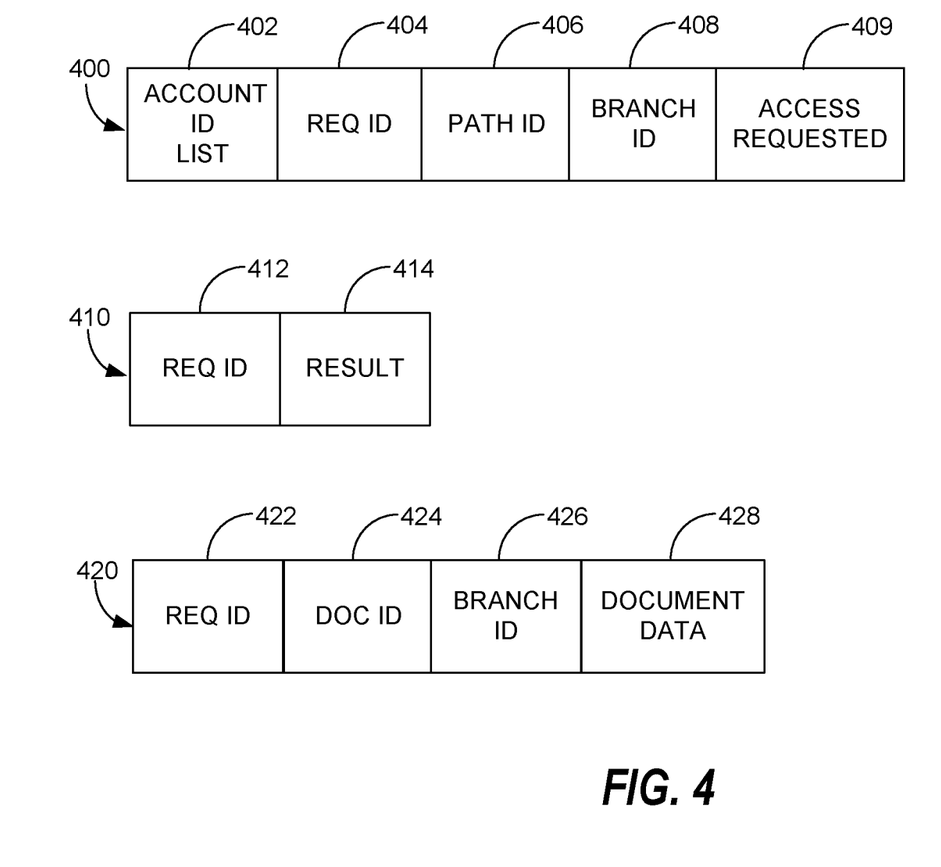
FIG. 4 shows example message portions implemented by one or more of the disclosed embodiments.

FIG. 4 shows example message portions implemented by one or more of the disclosed embodiments. FIG. 4 shows a request message portion 400, a response message portion 410, and a request completion message portion 420. In some embodiments, each of the request message portion 400, response message portion 410, and request completion message portion 420 are exchanged between a version control system (e.g. VCS 102) and a client device or user device (e.g. client device 106).

The message portion 400 includes an account identifier list field 402, request identifier field 404, path identifier field 406, branch identifier field 408, and an access requested field 409. The account identifier list field 402 uniquely identifies one or more authenticated accounts making a request. Any one of the account identifiers stored in the account identifier list field 402 is cross referenceable, in some embodiments, with the account identifier field 354 discussed above with respect to FIG. 3. Note that each authentication system (e.g. enterprise authentication system 108 and/or second authentication system 116) maintains a copy of the account table 352 in some embodiments. The request identifier field 404 uniquely identifies a particular request to a version control system, such as the VCS 102 discussed above with respect to FIG. 1. The path identifier field 406 defines a path within the version control system for which access is requested (e.g. "/module1/codefile 1"). The branch identifier field 408 uniquely identifies a branch to which the request is directed (e.g. any of the mainline branch 202, development branch 204, feature branch 212, or release branch 224 discussed above with respect to FIG. 2). The branch identifier specified in the field 408 is cross referenced, in some embodiments, with any of the branch identifier fields discussed above with respect to FIG. 3. The access requested field 409 defines a type of access requested by the request (the request identified by the request identifier field 404). The access requested field 409 specifies, in some embodiments, one or more of read access, write access, read/write access, or branch delete access.

The response message portion 410 includes a request identifier field 412, and a result field 414. The request identifier field 412 corresponds to the request identifier field 404. In other words, a response to a request includes an equivalent request identifier field value as the request itself. The result field 414 specifies a result of the request, e.g. granted or denied.

The request completion message portion 420 includes a request identifier field 422, document identifier field 424, branch identifier field 426, and a document data field 428. In cases where the request was a read request, the version control system transmits a request completion message portion including the requested data (if the request was granted). When the request was a write request, the requestor provides the request completion message portion, indicating the data to be written. To that end, the document identifier field 424 and branch identifier field 426, in combination, define a document for which data is provided. The document data field 428 defines the data of the document. Note for requests that apply to multiple documents, multiple request completion message portions are exchanged between a user device and the version control system.

Figure 5:
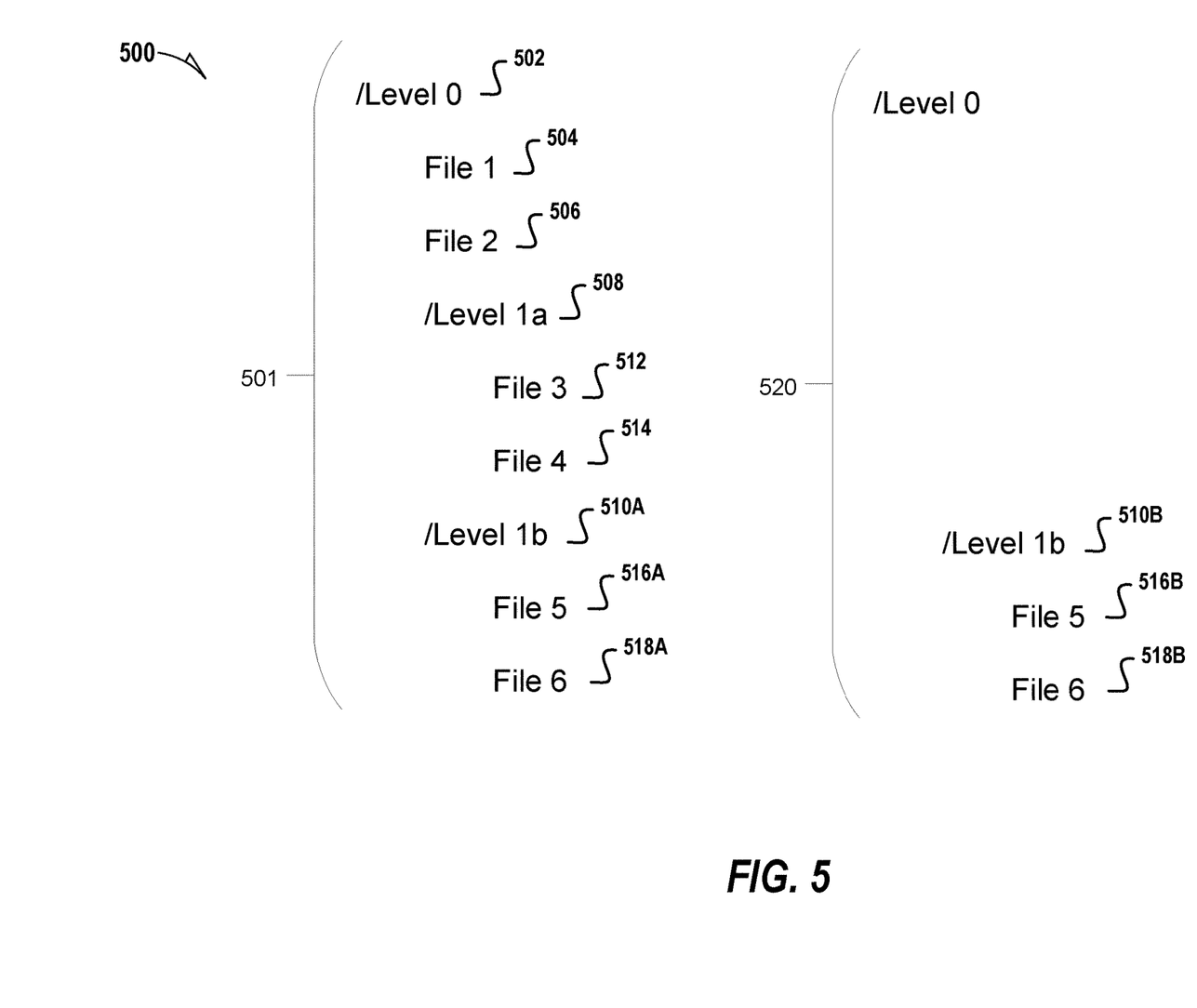
FIG. 5 shows an example structure of a version control branch.

FIG. 5 shows an example structure of a document repository 500. The document repository 500 includes a first branch 501 that includes a hierarchical file structure. As shown, a root level folder 502 includes files and/or folders at a first level. The first level includes files 504 and 506, as well as folder or directory 508 and folder or directory 510A. The folder or directory 508 includes file 512 and file 514, labeled "File 3" and "File 4" respectively. The folder or directory 510A includes file 516A and file 518A, labeled "File 5" and "File 6" respectively.

A second branch 520 is also shown in FIG. 5. The second branch 520 includes a subset of files included in the first branch 501. For example, the second branch includes the folder 510B, which corresponds with folder or directory 510A in the first branch 501, file 516B and file 518B that correspond to file 516A and file 516B in the first branch 501 respectively. However, no files corresponding to files 504, 506, 512, and 514 are included in the second branch 520, nor is folder or directory 508.

The VCS 102 maintains copies of files specific to each of the first branch 501 and the second branch 520. In some embodiments, two copies are stored, one for each branch. In some embodiments, the second branch 520 is implemented using delta information that tracks changes to files in the second branch 520 relative to their corresponding files in first branch 501. The disclosed embodiments provide for security polices specific to a particular branch. For example, some embodiments define a branch policy that applies to the first branch 501 but does not apply to second branch 520. Some of these same embodiments define a branch policy to second branch 520 but not to the first branch 501. In some embodiments, the VCS 102 supports branch operations which create new branches in a manner similar to that illustrated with first branch 501 and second branch 520. Additionally, the VCS 102 supports merge operations which integrated files of one branch with corresponding files of another branch, in at least some embodiments. For example, a merge operation of second branch 520 into first branch 501 would integrate any changes in the files of second branch 520 with data in the files of first branch 501. If one or more of the files in either of the first branch 501 and/or the second branch 520 were modified before the merge operation occurs, those changes are generally included in the resulting integrated file set of branches.

Figure 6:
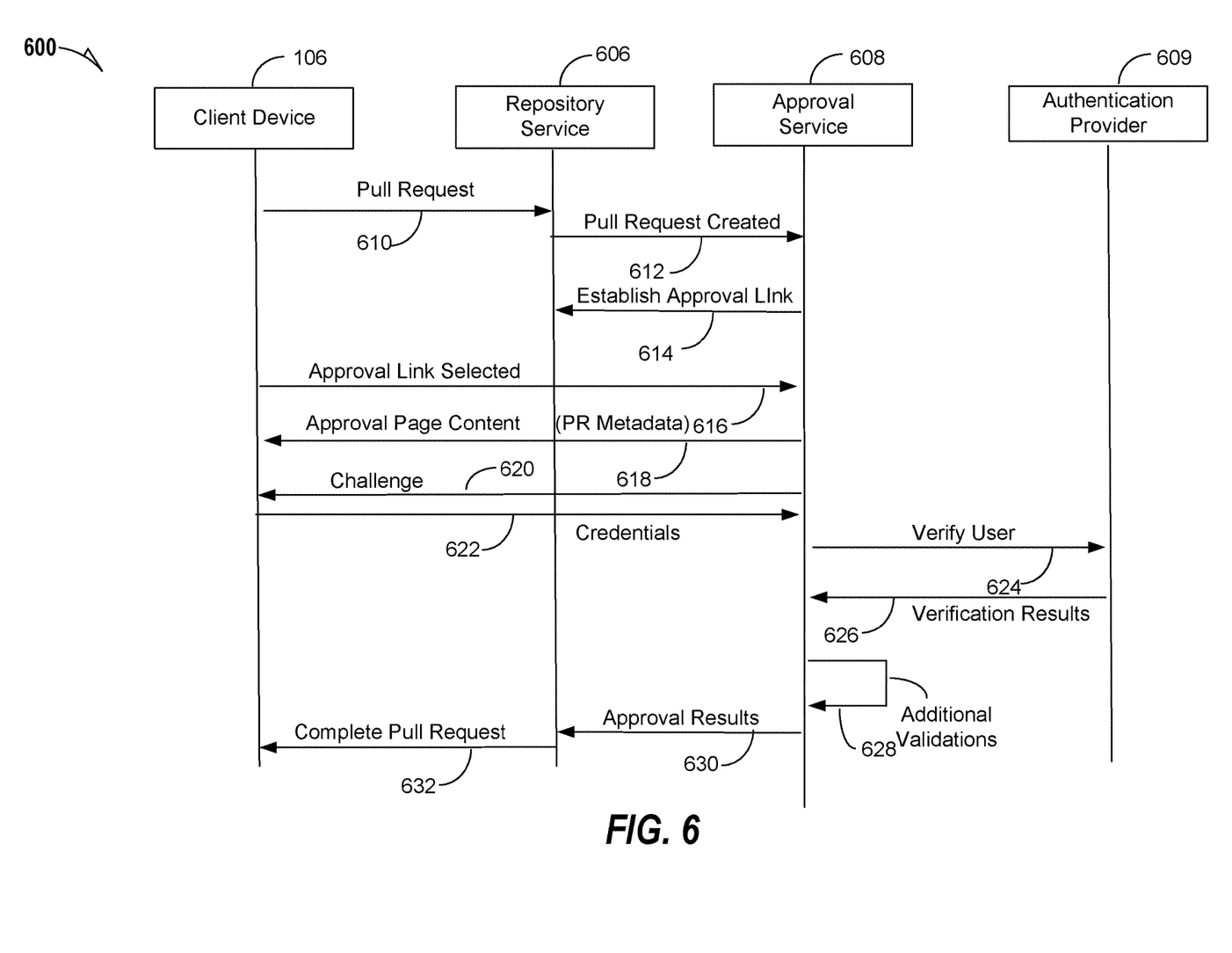
FIG. 6 is a sequence diagram showing message flows between components included in one or more of the disclosed embodiments.

FIG. 6 is a sequence diagram showing message flows between components included in one or more of the disclosed embodiments. FIG. 6 shows a client device 106, repository service 606, approval service 608, and authentication provider 609. In some embodiments, the repository service 606 runs on the VCS 102 computer. In some embodiments, the approval service 608 runs on the VCS 102 computer. In other embodiments, the approval service 608 runs on a different physical hardware device. In some embodiments, the approval server 608 is a web service. Thus, the approval service 608 is an external service in that it is external to the repository service. In some embodiments, the approval service 608 executes or runs on the approval server 124, discussed above with respect to FIG. 1. The repository service is configured to query the approval server 124 (e.g. or an approval service running on the approval server 124) based on branch configuration information, as discussed further below.

In some embodiments, the authentication provider 609 runs on the second authentication system 116. The authentication provider 609 relies on an authentication database, including authentication credentials, that is separate and distinct from any authentication credentials relied on by the enterprise authentication system 108 (e.g. via the enterprise authentication data store 110 in some embodiments).

The messaging sequence 600 shows a pull request message 610 transmitted by the client device 106 to the repository service 606. The pull request message 610 references a branch within a repository accessed by the repository service 606 (e.g. the document repository 104). In some embodiments, the pull request message 610 includes one or more fields of the message portion 400, discussed above with respect to FIG. 4. For example, the pull request message 610 references the branch via the branch identifier field 408 in some embodiments.

Upon receiving the pull request message 610, the repository service 606 determines that the branch referenced by the pull request message 610 requires approval by the approval service 608. For example, some embodiments of the repository service 606 maintain a mapping between branches and any services that must approve changes to documents within each of the branches (e.g. via the branch table 301, which maps a branch identifier (defined by field 304), to a security policy identifier (via field 306)). The repository service then sends a message 612 to the approval service 608, indicating receipt of the pull request message 610. The message 612 also includes, in some embodiments, information included in the pull request message 610, such as information to identify the branch to be approved.

After receiving the message 612, the approval service sends an establish approval link message 614 to the repository service 606. The establish approval link message 614 provides a URL that references a web server implemented or provided by the approval service 608. The repository service 606 stores this link such that the link is displayed in a user interface, with the user interface indicating that approval via the link is required before the pull request message 610 is approved.

A user on the client device 106 then selects the link via the user interface. A message 616 is transmitted, upon the selection, from the client device to the web server hosted or provided by the repository service 606. The approval service 608 also sends meta data via a message 618 to the client device 106. The approval service 608 responds to the message 616 with a challenge message 620. In some embodiments, the challenge message 620 is configured to cause the client device 106 to display a prompt for authentication credentials on a display of the client device 106.

After receiving input defining authentication credentials from the user, the client device 106 transmits a credentials message 622 to the approval service 608, which includes authentication credentials. The approval service 608 then passes the credentials via message 624 to an authentication provider 609, which in some embodiments, is analogous to the second authentication system 116 discussed above with respect to FIG. 1. Based on the credentials, the authentication provider 609 either approves or disapproves access to the specified branch and communications the decision via results message 626 to the approval service 608.

The authentication provided by the authentication provider 609 is generally not branch specific, but instead indicates whether the credentials provided are valid within the authentication system managed by the authentication provider 609. To authenticate the credentials, the authentication provider 609 compares the credentials to an authentication database or data store. This authentication database or data store includes credentials that are separate and distinct from those user credentials necessary to access the repository service generally, and/or other enterprise resources (e.g. distinct from enterprise authentication data store 110). Results of the authentication are provided to the approval service via the results message 626.

The approval service 608 performs, in some embodiments, one or more additional validations, approvals, or checks 628 to determine whether the user is approved for accessing the branch. For example, in some embodiments, the approval service 608 determines whether to approve the pull request based on a path or file in the document repository the user is attempting to access, a time of day, a location of the client device 106, an amount of data accessed by the pull request message 610, or other parameters. The approval service 608 then sends an approval results message 630 to the repository service 606. The repository service 606 then completes the pull request based on the approval results message 630 and notifies the client device 106 of the results based on the completed pull request message 632. In some embodiments the repository service 606 implements a "git" server.

Figure 7:
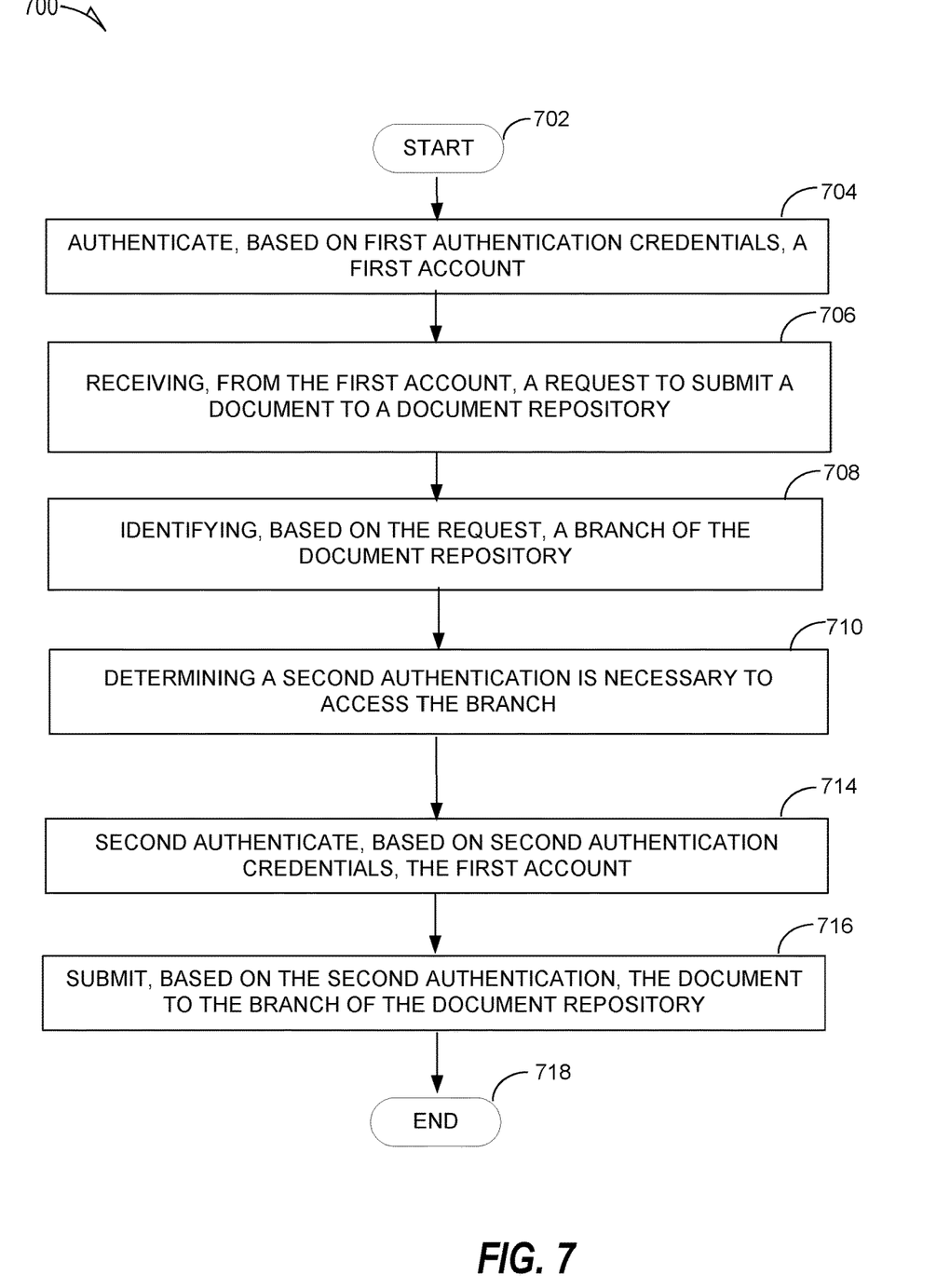
FIG. 7 is a flowchart of a method for authenticating a branch of a version control system.
Figure 8:
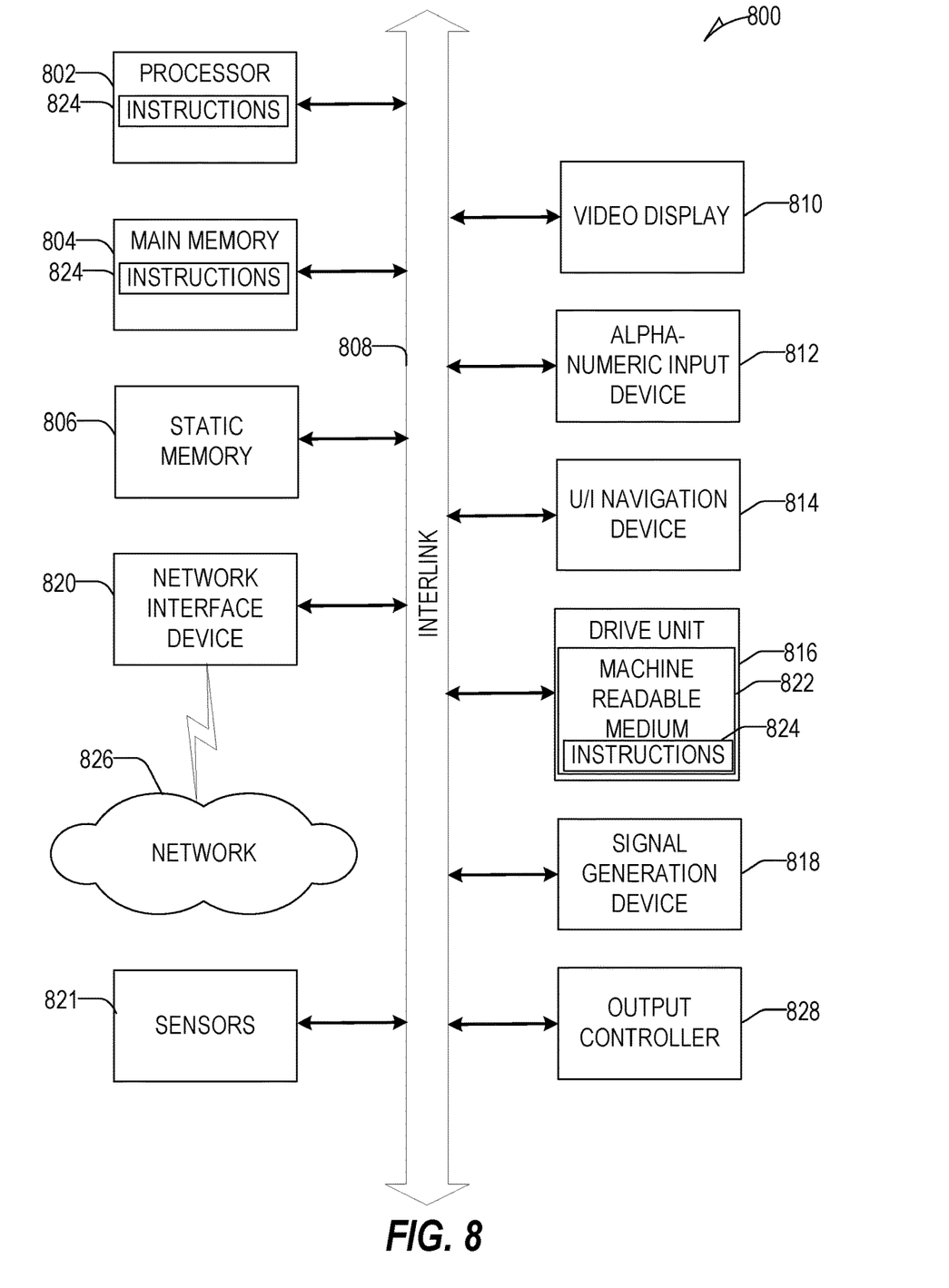
FIG. 8 illustrates a block diagram of an example machine 800 upon which any one or more of the techniques (e.g., methodologies) discussed herein may perform.

FIG. 7 is a flowchart of a method for authenticating a branch of a version control system. In some embodiments, one or more of the functions discussed below with respect to FIG. 7 and method 700 is performed by hardware processing circuitry. For example, in some embodiments, instructions (e.g. instructions 824 discussed below) stored in a memory (e.g. memory 804 and/or 806 discussed below), configure hardware processing circuitry (e.g. hardware processor 802 discussed below) to perform one or more of the functions of method 700. Thus, in some embodiments, the method 700 is a device-implemented method.

After start operation 702, method 700 moves to operation 704. In operation 704, a first account is authenticated. The authentication is based on first authentication credentials. The first account authentication of operation 704 compares the first authentication credentials to credentials in a first authentication data store. For example, in some embodiments, the first authentication credentials (e.g. account name, password) are compared to a first authentication data store analogous to the enterprise authentication data store 110, discussed above with respect to FIG. 1. The first authentication data store stores data that associates the first account with a first set of authentication credentials (e.g. account name, account password, account secondary password). In some embodiments, the authentication of operation 704 provides access to enterprise resources, such as the enterprise resources 112 discussed above with respect to FIG. 1. In some embodiments, the authentication of operation 704 also provides access to at least a portion of a document repository (e.g. document repository 104). For example, the first authentication of operation 704 provides, in an example, access to the second branch 520 discussed above with respect to FIG. 5, but not to the first branch 501.

In operation 706, a request is received from the first account. The request is to submit a document to a document repository. In some embodiments, the request includes one or more of the fields of message portion 400, discussed above. The request identifies a branch to which access is requested. In an example embodiment, access is requested to first branch 501 of FIG. 5, while a user requesting access already has access to the second branch 520 via the first authentication of operation 704.

In operation 708, a branch of the document repository is identified. For example, in some embodiments, the request is decoded or parsed to identify the branch. In some embodiments, the request includes one or more of the fields discussed above with respect to the message portion 400. For example, the branch is indicated, in some embodiments, by branch identifier field 408.

In operation 710, a determination is made that a second authentication is necessary to access the branch. For example, in some embodiments, operation 710 identifies the branch in the branch table 301. A mapping of the branch to a security policy is then determined (e.g. via branch table 301). The security policy indicates the additional authentication is necessary (e.g. via security policy table 311 and/or authentication identifier field 314 in some embodiments). As discussed above, whether a second authentication is necessary is conditioned on multiple factors in various embodiments. For example, as discussed above, some embodiments condition the second authentication based on a location of a client device requesting access to the branch. In some embodiments, the condition may indicate that a client device within a particular geographic region is not required to perform the second authentication to access the branch, while a second client device outside that particular geographic region is required to perform the second authentication to access the same branch. Some embodiments define certain locations or regions that unconditionally require the second authentication. For example, some embodiments define that any client device within a defined geographic region must perform the second authentication.

Some embodiments condition the second authentication on an amount of data for which access is requested (e.g. via data size field 318). Thus, if an account requests access to an amount of data that exceeds a predefined limit specified, (e.g. an entire operating system kernel code base), then a second authentication is required. If the amount of data requested is below the predefined limit, some embodiments do not require the second authentication when accessing the branch. These various policies can also be combined in various embodiments (e.g. client devices within a particular region requesting access to data greater than a predefined data limit require the second authentication).

In operation 714, the second authentication is performed. The second authentication is based on a second authentication data store that is different from the authentication data store used to perform the first authentication of operation 704 (e.g. contrast the enterprise authentication data store 110 and the second authentication data store 118). Thus, while the first authentication data store stores a first association between the first account and first authentication credentials, the second authentication data store stores a different second association between the first account and second authentication credentials.

Performing the second authentication includes, in at least some embodiments, exchanging messages with an authentication service. For example, in some embodiments, an approval service (e.g. running on the approval server 124) acts as a proxy between a client device (e.g. 106) and the authentication service (e.g. running on the second authentication system 116 in some embodiments). Thus, performing the second authentication includes, in some embodiments, receiving an authentication request from the client device by the approval service (e.g. message 622 discussed above with respect to FIG. 6), and then the approval service requests authentication from the authentication service (e.g. message 624 of FIG. 6 discussed above). In some embodiments, the approval service requests the second authentication from the authentication service (e.g. and authentication system) without any message exchanges between the approval service and the client device.

In operation 716, a document is submitted to the document repository based on the second authentication. If the second authentication is successful, some embodiments submit the document, while if the second authentication is not successful, the document is disapproved for submission and thus a submission is inhibited. After operation 716 is completed, method 700 moves to end operation 718.

Some embodiments of method 700 process multiple requests to submit documents. Each of these multiple requests are, in various embodiments, from the first account or a different second account. Each of the multiple requests indicates a branch, and method 700 determines whether the branch requires additional authentication, in some embodiments, in a manner similar to that described above with respect to operation 710. If so, method 700 performs the additional authentication, with access to the branch conditioned on whether the authentication succeeds, if it is needed to access the branch. Note that, in some of the disclosed embodiments, one or more requests processed by method 700 are not to submit (write) documents to the document repository but instead to read documents (e.g. a "check-out" operation) from the document repository. As described above with respect to FIG. 3, security policy table 311 provides for definitions of access types (e.g. via field 316) that require additional authentication in some embodiments.

FIG. 8 illustrates a block diagram of an example machine 800 upon which any one or more of the techniques (e.g., methodologies) discussed herein may perform. In alternative embodiments, the machine 800 may operate as a standalone device or are connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 800 may perform one or more of the processes described above with respect to FIGS. 1-7 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software may reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink 808 (e.g., bus). The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 are a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software may accordingly configure a hardware processor, for example, to constitute a particular module at one instance of time and to constitute a different module at a different instance of time.

Various embodiments are implemented fully or partially in software and/or firmware. This software and/or firmware may take the form of instructions contained in or on a non-transitory computer-readable storage medium. Those instructions may then be read and executed by one or more processors to enable performance of the operations described herein. The instructions are in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

Example 1 is a method, comprising: receiving, from an account, a request to submit a document to a document repository; decoding, based on the first authenticating, the request; identifying, based on the decoding, a branch of the document repository; determining the branch requires a second authentication; second authenticating, via a second authentication system, the account in response to the required second authentication; and submitting, based on the second authenticating, the document to the first branch of the document repository.

In Example 2, the subject matter of Example 1 optionally includes receiving, from the account, a second request to submit a second document to the document repository; second decoding, based on the first authenticating, the second request; identifying, based on the second decoding, a second branch of the document repository; determining a second authentication is not required to access the second branch; and submitting, based on the first authenticating, the second document to the second branch of the document repository.

In Example 3, the subject matter of any one or more of Examples 1-2 optionally include wherein the first authentication system is configured to associate the account with a first set of credentials and the second authentication system is configured to associate the account with a second set of credentials.

In Example 4, the subject matter of any one or more of Examples 1-3 optionally include wherein the determining that the first branch requires the second authentication comprises identifying a branch policy associated with the first branch, and determining, based on the branch policy, that the first branch requires the second authentication.

In Example 5, the subject matter of Example 4 optionally includes wherein the second authenticating via the second authentication system comprises querying a web service.

In Example 6, the subject matter of Example 5 optionally includes identifying, based on the branch policy, the web service.

In Example 7, the subject matter of any one or more of Examples 1-6 optionally include wherein the first authentication system is configured to control access to enterprise resources, and the second authentication system is configured to control access to a data center.

Example 8 is a system, comprising: hardware processing circuitry; and one or more hardware memories storing instructions that when executed, configure the hardware processing circuitry to perform operations comprising: receiving, from an account, a request to submit a document to a document repository; decoding, based on the first authenticating, the request; identifying, based on the decoding, a branch of the document repository; determining the branch requires a second authentication; second authenticating, via a second authentication system, the account in response to the required second authentication; and submitting, based on the second authenticating, the document to the first branch of the document repository.

In Example 9, the subject matter of Example 8 optionally includes the operations further comprising: receiving, from the account, a second request to submit a second document to the document repository; second decoding, based on the first authenticating, the second request; identifying, based on the second decoding, a second branch of the document repository; determining a second authentication is not required to access the second branch; and submitting, based on the first authenticating, the second document to the second branch of the document repository.

In Example 10, the subject matter of any one or more of Examples 8-9 optionally include wherein the first authentication system is configured to associate the account with a first set of credentials and the second authentication system is configured to associate the account with a second set of credentials.

In Example 11, the subject matter of any one or more of Examples 8-10 optionally include wherein the determining that the first branch requires the second authentication comprises identifying a branch policy associated with the first branch, and determining, based on the branch policy, that the first branch requires the second authentication.

In Example 12, the subject matter of Example 11 optionally includes wherein the second authenticating via the second authentication system comprises querying a web service.

In Example 13, the subject matter of Example 12 optionally includes the operations further comprising further identifying, based on the branch policy, the web service.

In Example 14, the subject matter of any one or more of Examples 8-13 optionally include wherein the first authentication system is configured to control access to enterprise resources, and the second authentication system is configured to control access to a data center.

Example 15 is a non-transitory computer readable storage medium comprising instructions that when executed configure hardware processing circuitry to perform operations comprising: receiving, from an account, a request to submit a document to a document repository; decoding, based on the first authenticating, the request; identifying, based on the decoding, a branch of the document repository; determining the branch requires a second authentication; second authenticating, via a second authentication system, the account in response to the required second authentication; and submitting, based on the second authenticating, the document to the first branch of the document repository.

In Example 16, the subject matter of Example 15 optionally includes the operations further comprising: receiving, from the account, a second request to submit a second document to the document repository; second decoding, based on the first authenticating, the second request; identifying, based on the second decoding, a second branch of the document repository; determining a second authentication is not required to access the second branch; and submitting, based on the first authenticating, the second document to the second branch of the document repository.

In Example 17, the subject matter of any one or more of Examples 15-16 optionally include wherein the first authentication system is configured to associate the account with a first set of credentials and the second authentication system is configured to associate the account with a second set of credentials.

In Example 18, the subject matter of any one or more of Examples 15-17 optionally include wherein the determining that the first branch requires the second authentication comprises identifying a branch policy associated with the first branch, and determining, based on the branch policy, that the first branch requires the second authentication.

In Example 19, the subject matter of Example 18 optionally includes wherein the second authenticating via the second authentication system comprises querying a web service.

In Example 20, the subject matter of Example 19 optionally includes the operations further comprising further identifying, based on the branch policy, the web service.

In Example 21, the subject matter of any one or more of Examples 15-20 optionally include wherein the first authentication system is configured to control access to enterprise resources, and the second authentication system is configured to control access to a data center.

We claim:

1. A device-implemented method, comprising:
    first authenticating, via a first authentication system, an account to access a document repository;
    receiving, from the account and in response to a valid authentication, a request to submit a document to the document repository;
    decoding, based on the first authenticating being valid, the request;
    identifying, based on the decoding, a branch of the document repository to which the document is to be stored, the branch is one of a plurality of branches of the document repository, the branch of the branches including a non-overlapping subset of the document repository;
    determining that accessing the branch requires a second authentication in addition to the first authentication;
    second authenticating, via a second authentication system, the account in response to determining the branch requires the second authentication; and
    submitting, based on the second authenticating being valid, the document to the branch of the document repository.

2. The method of claim 1, further comprising:
    receiving, from the account, a second request to submit a second document to the document repository;
    second decoding, based on the first authenticating, the second request;
    identifying, based on the second decoding, a second branch of the document repository;
    determining a second authentication is not required to access the second branch; and
    submitting, based on the first authenticating, the second document to the second branch of the document repository.

3. The method of claim 1, wherein the first authentication system is configured to associate the account with a first set of credentials and the second authentication system is configured to associate the account with a second set of credentials.

4. The method of claim 1, wherein the determining that the first branch requires the second authentication comprises identifying a branch policy associated with the first branch, and determining, based on the branch policy, that the first branch requires the second authentication.

5. The method of claim 4, wherein the second authenticating via the second authentication system comprises querying a web service.

6. The method of claim 5, further identifying, based on the branch policy, the web service.

7. The method of claim 1, wherein the first authentication system is configured to control access to enterprise resources, and the second authentication system is configured to control access to a data center.

8. A system, comprising:
    hardware processing circuitry; and
    one or more hardware memories storing instructions that when executed, configure the hardware processing circuitry to perform operations comprising:
    first authenticating, via a first authentication system, an account to access a document repository;
    receiving, from the account and in response to a valid authentication, a request to submit a document to the document repository;
    decoding, based on the first authenticating being valid, the request;
    identifying, based on the decoding, a branch of the document repository to which the document is to be stored, the branch is one of a plurality of branches of the document repository, the branch of the branches including a non-overlapping subset of the document repository;
    determining that accessing the branch requires a second authentication in addition to the first authentication;
    second authenticating, via a second authentication system, the account in response to determining the branch requires the second authentication; and
    submitting, based on the second authenticating being valid, the document to the branch of the document repository.

9. The system of claim 8, the operations further comprising:
    receiving, from the account, a second request to submit a second document to the document repository;
    second decoding, based on the first authenticating, the second request;
    identifying, based on the second decoding, a second branch of the document repository;
    determining a second authentication is not required to access the second branch; and
    submitting, based on the first authenticating, the second document to the second branch of the document repository.

10. The system of claim 8, wherein the first authentication system is configured to associate the account with a first set of credentials and the second authentication system is configured to associate the account with a second set of credentials.

11. The system of claim 8, wherein the determining that the first branch requires the second authentication comprises identifying a branch policy associated with the first branch, and determining, based on the branch policy, that the first branch requires the second authentication.

12. The system of claim 11, wherein the second authenticating via the second authentication system comprises querying a web service.

13. The system of claim 12, the operations further comprising further identifying, based on the branch policy, the web service.

14. The system of claim 8, wherein the first authentication system is configured to control access to enterprise resources, and the second authentication system is configured to control access to a data center.

15. A non-transitory computer readable storage medium comprising instructions that when executed configure hardware processing circuitry to perform operations comprising:
   first authenticating, via a first authentication system, an account to access a document repository;
   receiving, from the account and in response to a valid authentication, a request to submit a document to the document repository;
   decoding, based on the first authenticating being valid, the request;
   identifying, based on the decoding, a branch of the document repository to which the document is to be stored, the branch is one of a plurality of branches of the document repository, the branch of the branches including a non-overlapping subset of the document repository;
   determining that accessing the branch requires a second authentication in addition to the first authentication;
   second authenticating, via a second authentication system, the account in response to determining the branch requires the second authentication; and
   submitting, based on the second authenticating being valid, the document to the branch of the document repository.

16. The non-transitory computer readable storage medium of claim 15, the operations further comprising:
   receiving, from the account, a second request to submit a second document to the document repository;
   second decoding, based on the first authenticating, the second request;
   identifying, based on the second decoding, a second branch of the document repository;
   determining a second authentication is not required to access the second branch; and
   submitting, based on the first authenticating, the second document to the second branch of the document repository.

17. The non-transitory computer readable storage medium of claim 15, wherein the first authentication system is configured to associate the account with a first set of credentials and the second authentication system is configured to associate the account with a second set of credentials.

18. The non-transitory computer readable storage medium of claim 15, wherein the determining that the first branch requires the second authentication comprises identifying a branch policy associated with the first branch, and determining, based on the branch policy, that the first branch requires the second authentication.

19. The non-transitory computer readable storage medium of claim 18, wherein the second authenticating via the second authentication system comprises querying a web service.

20. The non-transitory computer readable storage medium of claim 19, the operations further comprising further identifying, based on the branch policy, the web service.

* * * * *